s007060750B2 US007060750B2

(12) United States Patent
Jansen et al.

(10) Patent No.: US 7,060,750 B2
(45) Date of Patent: Jun. 13, 2006

(54) MOISTURE-CURABLE, POLYETHER URETHANES AND THEIR USE IN SEALANT, ADHESIVE AND COATING COMPOSITIONS

(75) Inventors: Craig E. Jansen, Wexford, PA (US); Kurt C. Frisch, Upper St. Clair, PA (US); Richard R. Roesler, Wexford, PA (US); Dinesh Pethiyagoda, Pittsburgh, PA (US); Kevan E. Hudson, Clinton, PA (US)

(73) Assignee: Bayer MaterialScience LLC, Pittsburgh, PA (US)

( * ) Notice: Subject to any disclaimer, the term of this patent is extended or adjusted under 35 U.S.C. 154(b) by 0 days.

(21) Appl. No.: 10/834,143

(22) Filed: Apr. 28, 2004

(65) Prior Publication Data

US 2005/0245716 A1    Nov. 3, 2005

(51) Int. Cl.
    C08G 18/48    (2006.01)
(52) U.S. Cl. ............... 524/847; 524/871; 528/28; 528/29; 528/38
(58) Field of Classification Search ............... 524/847, 524/871; 528/28, 29, 38
    See application file for complete search history.

(56) References Cited

U.S. PATENT DOCUMENTS

| 3,278,457 | A |   | 10/1966 | Milgrom ............... 260/2 |
| 3,278,458 | A |   | 10/1966 | Belnar ............... 260/2 |
| 3,278,459 | A |   | 10/1966 | Herold ............... 260/2 |
| 3,427,256 | A |   | 2/1969  | Milgrom ............... 252/431 |
| 3,427,334 | A |   | 2/1969  | Belner ............... 260/429 |
| 3,427,335 | A |   | 2/1969  | Herold ............... 260/429 |
| 3,829,505 | A |   | 8/1974  | Herold ............... 260/611 B |
| 3,941,849 | A |   | 3/1976  | Herold ............... 260/607 A |
| 4,035,557 | A |   | 7/1977  | Jones ............... 526/14 |
| 4,222,925 | A | * | 9/1980  | Bryant et al. ............... 524/589 |
| 4,355,188 | A |   | 10/1982 | Herold et al. ............... 568/620 |
| 4,364,955 | A |   | 12/1982 | Krämer ............... 424/269 |
| 4,472,560 | A |   | 9/1984  | Kuyper et al. ............... 526/120 |
| 4,721,818 | A |   | 1/1988  | Harper et al. ............... 568/120 |
| 4,843,054 | A |   | 6/1989  | Harper ............... 502/175 |
| 4,857,623 | A |   | 8/1989  | Emmerling et al. ............... 528/28 |
| 5,068,304 | A |   | 11/1991 | Higuchi et al. ............... 528/28 |
| 5,227,434 | A |   | 7/1993  | Katz ............... 525/419 |
| 5,364,955 | A |   | 11/1994 | Zwiener et al. ............... 556/418 |
| 5,410,135 | A | * | 4/1995  | Pollart et al. ............... 219/730 |
| 5,482,908 | A |   | 1/1996  | Le-Khac ............... 502/156 |
| 5,554,709 | A |   | 9/1996  | Emmerling et al. ............... 528/27 |
| 6,197,912 | B1 |  | 3/2001  | Huang et al. ............... 528/28 |
| 6,265,517 | B1 | * | 7/2001  | Stuart ............... 528/28 |
| 6,498,210 | B1 |  | 12/2002 | Wang et al. ............... 524/588 |
| 6,545,087 | B1 |  | 4/2003  | Schmalstieg et al. ............... 525/38 |
| 6,809,170 | B1 |  | 10/2004 | Roesler |
| 6,833,423 | B1 |  | 12/2004 | Roesler |
| 6,844,413 | B1 |  | 1/2005  | Roesler |
| 6,887,964 | B1 |  | 5/2005  | Frisch |
| 2003/0225235 | A1 | | 12/2003 | Roesler ............... 528/10 |
| 2003/0225237 | A1 | | 12/2003 | Roesler et al. ............... 528/28 |
| 2003/0229192 | A1 | | 12/2003 | Frisch et al. ............... 528/10 |
| 2003/0232942 | A1 | | 12/2003 | Roesler et al. ............... 528/10 |
| 2003/0232949 | A1 | | 12/2003 | Roesler et al. ............... 528/28 |
| 2003/0232950 | A1 | | 12/2003 | Roesler et al. ............... 528/28 |
| 2004/0132949 | A1 | | 7/2004  | Roesler |

FOREIGN PATENT DOCUMENTS

| CA | 2325552 | 9/1999 |
| EP | 0 546 310 | 6/1993 |
| WO | 98/18843 | 5/1998 |
| WO | 99/13002 | 3/1999 |
| WO | 02/06367 A1 | 1/2002 |
| WO | 2005/042606 A1 | 5/2005 |

OTHER PUBLICATIONS

U.S. Appl. No. 10/690,751, filed Oct. 22, 2003.

\* cited by examiner

*Primary Examiner*—Rachel Gorr
(74) *Attorney, Agent, or Firm*—Joseph C. Gil; Thomas W. Roy

(57) ABSTRACT

An adhesive, sealant or coating composition that includes:
a) 20 to 80% by weight, based on the weight of a), b), and c) of a polyether urethane containing two or more reactive silane groups and one or more polyether segments,
b) 20 to 80% by weight, based on the weight of a), b), and c) of a polyether urethane containing one reactive silane group and one or more polyether segments, and
c) 1 to 60% by weight, based on the weight of a), b), and c) of a pigment having a BET surface area of from 15 to 100 $m^2/g$ and an oil absorption of from 40 to 110 cc/100 g;
where the sum of a), b), and c) does not exceed 100% by weight. The composition can be used to bond and/or coat substrates.

20 Claims, No Drawings

MOISTURE-CURABLE, POLYETHER URETHANES AND THEIR USE IN SEALANT, ADHESIVE AND COATING COMPOSITIONS

FIELD OF THE INVENTION

The present invention relates to moisture-curable polyether urethanes containing terminal cyclic urea/reactive silane groups and prepared from polyether polyols having a low degree of unsaturation and to the use of these polyether urethanes as sealants, adhesives and coatings.

BACKGROUND OF THE INVENTION

Polyether urethanes containing reactive silane groups, also referred to as silane-terminated polyurethanes (STPs), and their use as sealants and adhesives are known and described, e.g., in U.S. Pat. Nos. 5,554,709; 4,857,623; 5,227,434 and 6,197,912; and WO 02/06367. The silane-terminated polyurethanes may be prepared by various methods. In one method, the silane-terminated polyurethanes are prepared by reacting diisocyanates with polyether polyols to form isocyanate-terminated prepolymers, which are then reacted with aminosilanes to form the silane-terminated polyurethanes. The sealants may also be prepared by reacting unsaturated monools with diisocyanates to form intermediates containing unsaturated end groups and then converting these unsaturated groups to alkoxysilane groups by hydrosilylation. In another method, the sealants are prepared in one step by the reaction of polyether diols with isocyanato-silanes To be useful as sealants, the silane-terminated polyurethanes should have a number average molecular weight of 6,000 to 20,000. One method of obtaining this molecular weight is to use polyether diols prepared by the KOH process and having a molecular weight of 2,000 to prepare the isocyanate-terminated prepolymers. The presence of urethane groups causes the products to have a high viscosity. To achieve suitable application viscosities, the high viscosity is reduced by the addition of higher amounts of plasticizer and lesser amounts of fillers, resulting in more expensive sealant products.

Another method of obtaining high molecular weight sealants is by using high molecular weight polyether diols having a low degree of unsaturation and prepared using special catalysts as described in EP-A 0 546 310, EP-A 0 372 561 and DE-A 19 908 562. When these polyether diols are used, the resulting sealants have excellent tensile strength, but the sealants are too brittle for many applications because the elongation is too low and the 100% modulus is too high.

The preparation of sealants from mixtures of polyfunctional and monofunctional silane-terminated polyurethanes is known and disclosed in U.S. Pat. Nos. 5,554,709 and 4,857,623 and WO 02/06367. However, these references do not disclose the use of polyether polyols having a low degree of unsaturation and aspartate-functional silanes to prepare the sealants.

The preparation of silane-terminated polyether urethanes from aspartate-functional silanes is disclosed in U.S. Pat. No. 5,364,955 and WO 98/18843. In both of these references, the polyethers used to prepare polyether urethanes do not have a low degree of unsaturation. In addition, mixtures of polyfunctional and monofunctional silane-terminated polyurethanes are not disclosed. Finally, in the latter reference, the polyethers must contain 15 to 40% by weight of ethylene oxide units.

WO 00/26271 discloses the preparation of silane-terminated polyether urethanes from polyether polyols having a low degree of unsaturation and aspartate-functional silanes. The products are prepared by reacting diisocyanates with high molecular weight polyether diols to form NCO prepolymers, which are then capped with aspartate-functional silanes to form silane-terminated polyether urethanes. This application does not disclose mixtures of disilane-terminated polyether urethanes with polyether urethanes containing one reactive silane group.

U.S. Pat. No. 6,265,517 describes a similar process for preparing silane-terminated polyether urethanes from polyether polyols having a low degree of unsaturation and aspartate-functional silanes. The patent requires the starting polyol to have a monool content of less than 31 mole %, and teaches that a relatively high monool content is highly undesirable because monools react with isocyanates, thereby reducing crosslinking and curing of the prepolymer. The patent also requires the aspartate silanes to be prepared from dialkyl maleates in which the alkyl groups each contain more than four carbon atoms.

EP 0 372 561 discloses polyether urethanes containing reactive silane groups and prepared from polyether polyols having a low degree of unsaturation. In addition, polyether urethanes containing one reactive silane group are disclosed. This application fails to disclose the use of aspartate-functional silanes to incorporate the reactive silane groups.

Copending applications, Ser. Nos. 10/690,953, 10/690,954, 10/690,956, 10/690,955, 10/690,931 and 10/690,751, disclose alkoxysilane-functional polyether urethanes containing a mixture of polyether urethanes containing two or more reactive silane groups with polyether urethanes containing one reactive silane group. The polyether urethanes containing two or more reactive silane groups are prepared from high molecular weight polyether polyols having a low degree of unsaturation.

The deficiencies of the preceding sealants were addressed in U.S. Published Application Ser. Nos. 2003/0225237, 2003/0229192, 2003/0225235, 2003/0232949, 2003/0232950, and 2003/0232942, which describe moisture-curable, alkoxysilane-functional polyether urethanes containing both polyether urethanes having two or more reactive silane groups and polyether urethanes having one reactive silane group. The moisture-curable polyether urethanes are suitable for use as sealants, adhesives and coatings and have a suitable 100% modulus when compared with existing products. However, in some applications the moisture-curable polyethers do not possess a sufficiently high tensile strength.

In the referenced published applications, the polyether urethane component containing two or more reactive silane groups is prepared from high molecular weight polyether polyols having a low degree of unsaturation. In addition, at least a portion of the reactive silane groups present in at least one of the two components are incorporated by the use of silanes containing secondary amino groups.

U.S. Published Application Ser. No. 2003/0229192 describes moisture-curable polyether urethanes in which the silane groups are incorporated into the polyether urethanes having two or more reactive silane groups by the use of certain aspartate-functional silanes. A disadvantage of these moisture-curable polyether urethanes is that they are not storage stable at moderately elevated temperatures of 50 to 90° C., which may be present in a drum stored in a hot climate.

Accordingly, it is an object of the present invention to provide moisture-curable polyether urethanes that may be cured to provide products which are storage stable at elevated temperatures and also retain all of the valuable properties of the polyether urethanes disclosed in the preceding copending applications, i.e., the products are suitable for use as sealants, adhesives and coatings which possess high tensile strengths and elongations and have a reduced 100% modulus.

SUMMARY OF THE INVENTION

The present invention is directed to an adhesive, sealant or coating composition that includes:
  a) 20 to 80% by weight, based on the weight of a), b), and c) of a polyether urethane containing two or more reactive silane groups and one or more polyether segments,
  b) 20 to 80% by weight, based on the weight of a), b), and c) of a polyether urethane containing one reactive silane group and one or more polyether segments, and
  c) 1 to 60% by weight, based on the weight of a), b), and c) of a pigment having a BET surface area of from 15 to 100 m$^2$/g and an oil absorption of from 40 to 110 cc/100 g;

where the sum of a), b), and c) does not exceed 100% by weight.

The present invention is also directed to a method of bonding a first substrate to a second substrate as well as assemblies made thereby, the method including:
  combining a), b), and c) as defined above to form a mixture,
  applying a coating of the mixture to at least one surface of the first substrate or the second substrate, and
  contacting a surface of the first substrate with a surface of the second substrate, where at least one of the contacting surfaces has the coating applied thereto.

The present invention is additionally directed to a method of coating a substrate, and substrates coated thereby, the method including applying the above-described coating composition to at least a portion of a surface of the substrate.

DETAILED DESCRIPTION OF THE INVENTION

Other than in the operating examples, or where otherwise indicated, all numbers or expressions referring to quantities of ingredients, reaction conditions, etc., used in the specification and claims are to be understood as modified in all instances by the term "about." Various numerical ranges are disclosed in this patent application. Because these ranges are continuous, they include every value between the minimum and maximum values. Unless expressly indicated otherwise, the various numerical ranges specified in this application are approximations.

As used herein the term "alkyl" refers to a monovalent radical of an aliphatic hydrocarbon chain of general formula $C_sH2_{s+1}$, where s is the number of carbon atoms, or ranges therefore, as specified. The term "substituted alkyl" refers to an alkyl group, where one or more hydrogens are replaced with a non-carbon atom or group, non-limiting examples of such atoms or groups include halides, amines, alcohols, oxygen (such as ketone or aldehyde groups), and thiols. "Alkylol" refers to an alkyl group containing at least one hydroxyl group.

As used herein the terms "cyclic alkyl" or "cycloalkyl" refer to a monovalent radical of an aliphatic hydrocarbon chain that forms a ring of general formula $C_sH2_{s-1}$, where s is the number of carbon atoms, or ranges therefore, as specified. The term "substituted cycloalkyl" refers to a cycloalkyl group, containing one or more hetero atoms, non-limiting examples being —O—, —NR—, and —S— in the ring structure, and/or where one or more hydrogens are replaced with a non-carbon atom or group, non-limiting examples of such atoms or groups include halides, amines, alcohols, oxygen (such as ketone or aldehyde groups), and thiols. R represents an alkyl group of from 1 to 24 carbon atoms.

As used herein, the term "aryl" refers to a monovalent radical of an aromatic hydrocarbon. Aromatic hydrocarbons include those carbon based cyclic compounds containing conjugated double bonds where 4t+2 electrons are included in the resulting cyclic conjugated pi-orbital system, where t is an integer of at least 1. As used herein, aryl groups can include single aromatic ring structures, one or more fused aromatic ring structures, covalently connected aromatic ring structures, any or all of which can include heteroatoms. Non-limiting examples of such heteroatoms that can be included in aromatic ring structures include O, N, and S.

As used herein, the term "alkylene" refers to acyclic or cyclic divalent hydrocarbons having a carbon chain length of from $C_1$ (in the case of acyclic) or $C_4$ (in the case of cyclic) to $C_{25}$, typically $C_2$ to $C_{12}$, which may be substituted or unsubstituted, and which may include substituents. As a non-limiting example, the alkylene groups can be lower alkyl radicals having from 1 to 12 carbon atoms. As a non-limiting illustration, "propylene" is intended to include both n-propylene and isopropylene groups; and, likewise, "butylene" is intended to include both n-butylene, isobutylene, and t-butylene groups.

As used herein, the term "(meth)acrylic" and "(meth) acrylate" are meant to include the corresponding derivatives of acrylic acid and methacrylic acid, without limitation.

As used herein, the term "cure" (or "curing") is intended to include both crosslinking of the adhesive, sealant, or coating composition components and film formation as a result of evaporation of water and, if present, other solvents and diluents along with the development of physical and chemical properties in the resultant film such as bond strength and peel strength.

As used herein, the term "crosslink" or "crosslinking" refers to the formation of short side chains of molecules linking two longer molecular chains together through the reaction of two or more functional groups on the short side chains.

Embodiments of the present invention provide an adhesive, sealant or coating composition that includes a) a polyether urethane containing two or more reactive silane groups and one or more polyether segments, b) a polyether urethane containing one reactive silane group and one or more polyether segments, and c) a pigment.

In an embodiment of the invention, the polyether urethane containing two or more reactive silane groups and one or more polyether segments for use as component a) includes polyether urethanes containing one or more, in many cases one, polyether segment having a number average molecular weight of 1,000 to 20,000, in some cases 3,000 to 15,000 and in other cases 6,000 to 12,000. As a non-limiting example, when the polyether segments have a number average molecular weight of 3,000, for example, then two or more of these segments can be present so that the number average molecular weights of all of the polyether segments per molecule averages 6,000 to 20,000. The polyether urethanes of a) also contain two or more, in many cases two reactive silane groups. The reactive silane groups can be incorporated by the reaction of an isocyanate group with a compound corresponding to formula I.

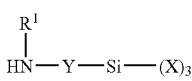

(I)

In accordance with the present invention, the term "reactive silane group" means a silane group containing at least two alkoxy or acyloxy groups as defined by substituent "X". A silane group containing two or three alkoxy and/or acyloxy groups is considered to be one reactive silane group. Also, a urethane is a compound containing one or more urethane and/or urea groups. These compounds can contain one or more urethane groups and may optionally contain urea groups. More preferably, these compounds contain both urethane and urea groups.

The polyether urethanes in a) may be prepared by several methods. For example, they may be prepared by reacting a high molecular weight polyether containing at least two isocyanate-reactive groups, in many cases hydroxyl groups, with an excess of a polyisocyanate, in many cases a diisocyanate, to form an NCO prepolymer. The resulting NCO prepolymer is then reacted with an aminosilane corresponding to formula I to form the polyether urethanes a).

The polyether urethanes a) can also be prepared by reacting an excess of a polyisocyanate with an aminosilane to form a monoisocyanate and then reacting the resulting intermediate with a high molecular weight polyether to form the polyether urethanes a).

Suitable aminosilanes are those corresponding to formula I, where

X represents identical or different organic groups which are inert to isocyanate groups below 100° C., provided that at least two of these groups are alkoxy or acyloxy groups, in many cases alkyl or alkoxy groups having 1 to 4 carbon atoms and in other cases alkoxy groups;

Y represents a linear or branched alkylene group containing 1 to 8 carbon atoms, in many cases a linear group containing 2 to 4 carbon atoms or a branched group containing 5 to 6 carbon atoms, in other cases a linear group containing 3 carbon atoms; and $R_1$ represents an organic group which is inert to isocyanate groups at a temperature of 100° C. or less, in many cases an alkyl, cycloalkyl or aromatic group having 1 to 12 carbon atoms; or a group corresponding to the formula

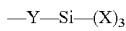

—Y—Si—(X)$_3$ where X and Y are as defined above.

In an embodiment of the invention, the compounds in which X represents methoxy, ethoxy groups or propoxy groups, in some cases methoxy or ethoxy groups, and Y can be a linear group containing 3 carbon atoms.

Examples of suitable aminoalkyl alkoxysilanes and aminoalkyl acyloxysilanes corresponding to formula I include 3-aminopropyl-triacyloxysilane; 3-aminopropyl-methyldimethoxysilane; 6-aminohexyl-tributoxysilane; 3-aminopropyl-trimethoxysilane; 3-aminopropyl-triethoxysilane; 3-aminopropyl-methyldiethoxysilane; 5-aminopentyl-trimethoxysilane; 5-aminopentyl-triethoxysilane; 4-amino-3,3-dimethylbutyl-trimethoxysilane; and 3-aminopropyl-triisopropoxysilane. In particular embodiments of the invention, the aminoalkyl alkoxysilanes can be 3-aminopropyl-trimethoxysilane and 3-aminopropyl-triethoxysilane.

Any suitable polyisocyanate can be used in the invention, such as polyisocyanates containing from 2 to 6 isocyanate groups. Suitable polyisocyanates which can be used to prepare the polyether urethanes in a) are known and include monomeric organic diisocyanates represented by the formula, OCN—$R^7$—NCO, in which $R^7$ represents an organic group obtained by removing the isocyanate groups from an organic diisocyanate having a molecular weight of 112 to 1,000, in many cases 140 to 400. Non-limiting examples of suitable $R^7$ groups include $C_2$ to $C_{24}$ linear, branched, and cyclic alkylene, arylene, and aralkylene, which may optionally contain one or more isocyanate groups. In a particular embodiment, the diisocyanates are those represented by the above formula in which $R^7$ represents a divalent aliphatic hydrocarbon group having from 4 to 18 carbon atoms, a divalent cycloaliphatic hydrocarbon group having from 5 to 15 carbon atoms, a divalent araliphatic hydrocarbon group having from 7 to 15 carbon atoms or a divalent aromatic hydrocarbon group having 6 to 15 carbon atoms.

Examples of suitable organic diisocyanates include, but are not limited to, 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3- and -1,4-diisocyanate, 1-isocyanato-2-isocyanatomethyl cyclopentane, 1-isocyanato-3-isocyanatomethyl-3,5,5-trimethyl-cyclohexane (isophorone diisocyanate or IPDI), bis-(4-isocyanato-cyclohexyl)-methane, 1,3- and 1,4-bis-(isocyanatomethyl)-cyclohexane, bis-(4-isocyanato-cyclohexyl)-methane, 2,4'-diisocyanatodicyclohexyl methane, bis-(4-isocyanato-3-methyl-cyclohexyl)-methane, α,α,α',α'-tetramethyl-1,3- and/or -1,4-xylylene diisocyanate, 1-isocyanato-1-methyl-4(3)-isocyanatomethyl cyclohexane, 2,4- and/or 2,6-hexahydro-toluylene diisocyanate, 1,3- and/or 1,4-phenylene diisocyanate, 2,4- and/or 2,6-toluylene diisocyanate, 2,4- and/or 4,4'-diphenylmethane diisocyanate and 1,5-diisocyanato naphthalene and mixtures thereof.

Monomeric polyisocyanates containing 3 or more isocyanate groups such as 4-isocyanatomethyl-1,8-octamethylene diisocyanate and aromatic polyisocyanates such as 4,4',4''-triphenylmethane triisocyanate and polyphenyl polymethylene polyisocyanates obtained by phosgenating aniline/formaldehyde condensates may also be used. Also suitable for use in some embodiments, are polyisocyanate adducts prepared from the preceding monomeric polyisocyanates and containing isocyanurate, uretdione, biuret, urethane, allophanate, iminooxadiazine dione, carbodiimide and/or oxadiazinetrione groups.

Particular embodiments of the invention are directed to polyether urethanes, where the diisocyanates include bis-(4-isocyanatocyclohexyl)-methane, 1,6-hexamethylene diisocyanate, isophorone diisocyanate, α,α,α',α'-tetramethyl-1,3- and/or -1,4-xylylene diisocyanate, 2,4- and/or 2,6-toluylene diisocyanate, and 2,4- and/or 4,4'-diphenylmethane diisocyanate. In particular aspects of this embodiment, the diisocyanates include isophorone diisocyanate, 2,4-toluylene diisocyanate and mixtures of 2,4- and 2,6-toluylene diisocyanate.

In an embodiment of the invention, the polyols for preparing the polyether urethanes in a) include polyether polyols, in many cases diols, having a number average molecular weight of at least 3,000, in some cases at least 6,000 and in other cases at least 8,000. Also, the number average molecular weight of the polyether polyol can be up to 20,000, in some cases up to 15,000 and in other cases up to 12,000. The number average molecular weight of the polyether polyol can vary and range between any of the values recited above.

In a particular embodiment of the invention, the polyethers have a maximum total degree of unsaturation of 0.1 milliequivalents/g (meq/g) or less, in some cases less than 0.04 (meq/g) in other cases less than 0.02 meq/g, in some situations less than 0.01 meq/g, in other situations 0.007 meq/g or less, and in particular situations 0.005 meq/g or less. The amount of unsaturation will vary depending on the method used to prepare the polyether as well as the molecular weight of the polyether. Such polyether diols are known and can be produced by, as a non-limiting example, the propoxylation of suitable starter molecules.

As another non-limiting example, minor amounts (up to 20% by weight, based on the weight of the polyol) of ethylene oxide can also be used. If ethylene oxide is used, it can be used as the initiator for or to cap the polypropylene oxide groups. Examples of suitable starter molecules include diols such as ethylene glycol, propylene glycol, 1,3-butanediol, 1,4-butanediol, 1,6 hexanediol and 2-ethylhexanediol-1,3. Also suitable are polyethylene glycols and polypropylene glycols.

Suitable methods for preparing polyether polyols are known and are described, for example, in EP-A 283 148, U.S. Pat. No. 3,278,457, U.S. Pat. No. 3,427,256, U.S. Pat. No. 3,829,505, U.S. Pat. No. 4,472,560. U.S. Pat. No. 3,278,458, U.S. Pat. No. 3,427,334, U.S. Pat. No. 3,941,849, U.S. Pat. No. 4,721,818, U.S. Pat. No. 3,278,459, U.S. Pat. No. 3,427,335 and U.S. Pat. No. 4,355,188. In many cases the polyether polyols are prepared using double metal cyanides as catalysts.

In addition to the polyether polyols, minor amounts (up to 20% by weight, based on the weight of the polyol) of low molecular weight dihydric and trihydric alcohols having a molecular weight 32 to 500 can also be used. Suitable examples include ethylene glycol, 1,3-butandiol, 1,4-butandiol, 1,6-hexanediol, glycerine or trimethylolpropane. However, the use of low molecular weight alcohols is only used in some embodiments of the invention.

It is also possible in accordance with the present invention to use aminopolyethers instead of the polyether polyols. The aminopolyethers may be prepared by aminating the corresponding polyether polyols in a known manner.

When preparing the polyether urethanes in a) from a diisocyanate, a diol and an aminosilane, the diisocyanate is reacted with the diol at an equivalent ratio of isocyanate groups to hydroxyl groups of approximately 2:1 to form an NCO prepolymer. In addition to the 2/1 adduct of the diisocyanate and diol, minor amounts of higher molecular weight oligomers are also formed, such as the 3/2 adduct, etc. When these oligomers are formed, the reaction mixture also contains a minor amount of unreacted diisocyanate, which can be removed, e.g., by distillation, or which can remain in the reaction mixture.

The NCO prepolymer is then reacted with the aminosilane at an equivalent ratio of isocyanate groups to amino groups of approximately 1:1. The resulting polyether urethane a) contains the reaction products of the NCO prepolymers with the aminosilanes and optionally polymers d), which are the reaction products of monomeric diisocyanates with the aminosilanes. Polymers d) are preferably present in an amount of less then 2% by weight, more preferably less than 1% by weight, based on the weight of polyether urethane a). When polymers c) are present, they are preferably present in an amount of at least 0.1% by weight, more preferably at least 0.5% by weight, based on the weight of polyether urethane a).

In an embodiment of the invention, the reactive silane groups of component b) are incorporated as the reaction product of an isocyanate group and a compound corresponding to the formula

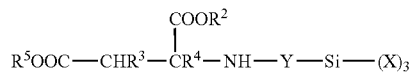

where
R$^2$ and R$^5$ are identical or different and represent organic groups which are inert to isocyanate groups at a temperature of 100° C. or less and
R$^3$ and R$^4$ are identical or different and represent hydrogen or organic groups which are inert towards isocyanate groups at a temperature of 100° C. or less.

In a particular embodiment of the invention, R$_2$ and R$_5$ are identical or different and represent alkyl groups having 1 to 4 carbon atoms and R$_3$ and R$_4$ represent hydrogen.

In an embodiment of the invention, the adhesive, sealant or coating compositions can contain the polyether urethane a) at a level of at least 20%, in some cases at least 25%, and in other cases at least 30% by weight. Also, the adhesive, sealant or coating compositions can contain the polyether urethane a) at a level of up to 80%, in some cases up to 75%, in other cases up to 70%, in some situations up to 65% and in other situations up to 60% by weight, based on the weight of a), b), and c). The amount of the polyether urethane a) in the adhesive, sealant or coating compositions can be any of the values recited above or can range between any of the values recited above.

In another embodiment of the invention, the adhesive, sealant or coating compositions can contain the polyether urethane containing one reactive silane group and one or more polyether segments b) at a level of at least 20%, in some cases at least 25%, and in other cases at least 30% by weight. Also, the adhesive, sealant or coating compositions can contain the polyether urethane b) at a level of up to 80%, in some cases up to 75%, in other cases up to 70%, in some situations up to 65% and in other situations up to 60% by weight, based on the weight of a), b), and c). The amount of the polyether urethane b) in the adhesive, sealant or coating compositions can be any of the values recited above or can range between any of the values recited above.

In a further embodiment of the invention, the adhesive, sealant or coating compositions can contain the pigment c) at a level of at least 1%, in some cases at least 2%, in other cases at least 5% by weight, in some situations at least 10% and in other situations at least 15% by weight. Also, the adhesive, sealant or coating compositions can contain the pigment c) at a level of up to 60%, in some cases up to 50%, in other cases up to 40%, in some situations up to 35% and in other situations up to 30% by weight, based on the weight of a), b), and c). The amount of the pigment c) in the adhesive, sealant or coating compositions can be any of the values recited above or can range between any of the values recited above.

The surface area of the pigment is important to structural reinforcement, viscosity and film formation. As the surface area of the pigment increases, structural reinforcement and viscosity will increase. The pigment c) can be characterized as having a BET surface area of at least 15, in some cases at least 25 and in other cases at least 35 m$^2$/g. When the surface area of the pigment is too low, there can be little or no structural reinforcement and, therefore, insufficient strength improvement to the adhesive, sealant or coating composition. Also, the BET surface area of pigment c) can be up to 100, in some cases up to 90, in other cases up to 85, in some situations up to 80, and in other situations up to 75 m$^2$/g. When the surface area is too high, the adhesive, sealant or coating composition will have a higher viscosity and not form a continuous film. When the viscosity is too high, it becomes difficult to apply the adhesive, sealant or coating. The BET surface area can be determined by any suitable method recognized in the art. A non-limiting example of BET Surface Area determination is described in DIN 66 131. The surface area of the pigment c) in the adhesive, sealant or coating compositions can be any of the values recited above or can range between any of the values recited above. The amount and desired surface area of the pigment will vary depending on the particular targeted properties and the amount and type of other components in the adhesive, sealant or coating composition.

The oil absorption of the pigment indicates the branching or structure of the pigment. The pigment c) can be characterized as having an oil absorption of at least 40, in some cases at least 45 and in other cases at least 50 cc/100 g. When the pigment oil absorption is too low, the pigment will not provide the desired reinforcing properties, resulting in an adhesive, sealant or coating composition with low cohesive strength. Also, the oil absorption of pigment c) can be up to 110, in some cases up to 105, in other cases up to 95 and in some situations up to 90 cc/100 g. When the pigment oil absorption is too high, the pigments will cause the viscosity of the adhesive, sealant or coating composition to be unacceptably high and will not form a continuous film. When the viscosity is too high, it becomes difficult to apply the adhesive, sealant or coating. The amount and oil absorption desired of the pigment will vary depending on the particular targeted properties and the amount and type of other components in the adhesive, sealant or coating composition.

The oil absorption can be determined by any suitable method recognized in the art. A non-limiting example of oil absorption determination is described in ISO 787 part 5. The oil absorption of the pigment c) in the adhesive, sealant or coating compositions can be any of the values recited above or can range between any of the values recited above.

Particle size of the pigment is correlated to the reinforcing properties of the pigment. A smaller pigment particle size will provide better reinforcement of the adhesive, sealant or coating composition. However, if the pigment size is too small, the polymer will be used up wetting out the pigment and its ability to form a continuous film is compromised. Thus, the pigment c) can be characterized as having average particle size (typically a weight average value) of at least 20 nm, in some cases at least 25 nm, in other cases at least 30 nm and in some situations at least 35 nm. Also the average particle size of pigment c) can be up to 90 nm, in some cases up to 80 nm, in other cases up to 75 nm and in some situations up to 70 nm. When the particle size is too large, little reinforcing of the polymer takes place and insufficient improvement in the cohesive strength of the adhesive, sealant or coating composition is realized. The amount and desired oil absorption desired of the pigment will vary depending on the particular targeted properties and the amount and type of other components in the adhesive, sealant or coating composition.

The average particle size can be determined by any suitable method recognized in the art. A non-limiting example of average particle size determination is by microscopy, image recognition and light scattering as is known in the art. The average particle size of the pigment c) in the adhesive, sealant or coating compositions can be any of the values recited above or can range between any of the values recited above.

Any suitable pigment can be used in the adhesive, sealant or coating compositions of the present invention. Examples of suitable pigments c) include, but are not limited to carbon black, titanium dioxide, calcium carbonate, iron oxide, aluminum trihydroxide, mica, calcium metasilicate, and mixtures thereof. In a particular embodiment of the invention, the pigment is carbon black.

In an embodiment of the invention, the adhesive, sealant or coating compositions can further include one or more materials selected from leveling agents, wetting agents, flow control agents, antiskinning agents, antifoaming agents, fillers, adhesion promoters, viscosity regulators, plasticizers, dyes, UV absorbers, thermal stabilizers, antioxidants, and mixtures thereof.

Non-limiting examples of plasticizers that can be used in the present invention include dioctyl phthalate (DOP) dibutyl phthalate (DBP); diisodecyl phthalate (DIDP); dioctyl adipate isodecyl malonate; diethylene glycol dibenzoate, pentaerythritol ester; butyl oleate, methyl acetylricinoleate; tricresyl phosphate and trioctyl phosphate; polypropylene glycol adipate and polybutylene glycol adipate; and the like. Such plasticizers can be used alone or in combination of two or more.

Non-limiting examples adhesion promoters that can be used in the present invention include epoxy resins, phenolic resins, silane and amino silane coupling agents known in the art, alkyl titanates and/or aromatic polyisocyanates. In a particular embodiment of the invention, the adhesion promoters are amino silanes, such as those available under the trade name SILQUEST® from OSI Corporation, Middlebury, Conn.

Non-limiting examples of catalysts, which may be used for curing, that can be used in the present invention include titanate esters, e.g., those of tetrabutyl titanate and tetrapropyl titanate; organotin compounds, e.g., dibutyl tin dilaurate, dibutyl tin maleate, dibutyl tin diacetate, tin octylate and tin naphthenate; lead octylate; amine-based compounds and salts of these compounds and carboxylates, e.g., butylamine, octylamine, dibutylamine, monoethanolamine, diethanolamine, triethanolamine, diethylenetriamine, triethylenetetramine, oleylamine, octylamine, cyclohexylamine, benzylamine, diethylaminopropylamine, xylylenediamine, triethylenediamine, guanidine, diphenylguanidine, 2,4,6-tris (dimethyl-aminomethyl) phenol, morpholine, N-methyl morpholine, and 1,3-diazabicyclo(5,4,6) undecene-7 (DBU); low-molecular-weight polyamide resins produced by the reactions between excessive quantities of polyamines and polybasic acids; products of the reactions between excessive quantities of polyamines and epoxy compounds; and known silanol condensing catalysts, e.g., silane coupling agents containing amino group (e.g., γ-aminopropyl trimethoxy silane and N-(β-aminoethyl)amino-propyl methyldimethoxy silane). These compounds may be used either individually or in combination.

Non-limiting examples of desicants that can be used in the present invention include calcium oxide, activated alumina, calcium chloride, silica gel, vinyltrimethoxysilane, and zinc chloride.

Non-limiting examples of leveling agents that can be used in the present invention include cellulose, e.g., nitrocellulose and cellulose acetate butyrate.

Non-limiting examples of wetting agents that can be used in the present invention include glycols, silanes, anionic surfactants, and any other wetting agents known in the art.

Non-limiting examples of flow control agents, that can be used in the present invention include polyacrylic esters, non-ionic fluorinated alkyl ester surfactants, non-ionic alkylarylpolyether alcohols, silicones, and the like, as well as those available under the trade name RESIFLOW® by Estron Chemical, Inc., Parsippany, N.J., those sold under the trade name Benzoin® by DSM, Inc.; those available under the trade name MODAFLOW® from Monsanto and those available under the trade name SURFYNOL® available from Air Products, Bethlehem, Pa.

Non-limiting examples of antiskinning agents that can be used in the present invention include lecithin, oximes, non-limiting examples being butyraldehayde oxime and methyl ethyl ketoxime, hydroquinones, non-limiting examples being 2,5-di-t-butyl-hydroquinone and the methyl esters of hydroquinone and anthraquinones.

Non-limiting examples of antifoaming agents that can be used in the present invention include those available as FOAMEX® from Rohm and Haas Company, Philadelphia, Pa., those available under the trade name BYK®, available from BYK-Chemie USA, Wallingford, Conn., and those available under the trade name FoamBrake® from BASF Corp., Mount Olive, N.J.

Non-limiting examples of fillers, in addition to the pigments in c), that can be used in the present invention include fumed silica, settling silica, silicic anhydride, silicic hydrate, talc, limestone powder, kaolin, diatomaceous earth, fired clay, clay, bentonite, organic bentonite, zinc oxide, activated zinc white, and fibrous fillers such as glass fibers or filaments. The filler can have any suitable particle size, in an embodiment of the invention, the filler particle size can be from 5 nm to 10 µm, in some cases 10 nm to 5 µm, and in other cases from 25 nm to 1 µm.

Non-limiting examples of viscosity regulators that can be used in the present invention include alkali-soluble, acid-soluble, and hydrophobically-modified alkali-soluble or acid-soluble emulsion polymers, those available as ACRYSOL® from Rohm and Haas Company, cellulosics, modified cellulosics, natural gums, such as xanthan gum, and the like. Included as viscosity regulators are polymers and dispersing aids that provide for high pigment loads at low viscosity, such as 9077, BYK-Chemie Gmbh, Wesel, Germany.

Non-limiting examples of pigments, in addition to the pigments in c), that can be used in the present invention include silica and magnesium carbonate.

Non-limiting examples of dyes that can be used in the present invention include mordant dyes, i.e., dyes prepared from plants, insects, and algae, and direct dyes, non-limiting examples being those based on benzidine or benzidine derivatives.

Non-limiting examples of ultra violet light absorbers that can be used in the present invention include benzotriazole-based ultra violet ray absorbers, salicylate-based ultraviolet ray absorbers, benzophenone-based ultraviolet ray absorbers, hindered amine-based light stabilizers and nickel-based light stabilizers. In a particular embodiment of the invention, hindered amine-based light stabilizers are used, such as those available under the trade name TINUVIN® from Ciba Specialty Chemicals, Basel, Switzerland.

Non-limiting examples of thermal stabilizers that can be used in the present invention include HCl scavengers, a non-limiting example being epoxidized soybean oil, esters of beta-thiodipropionic acid, non-limiting examples being lauryl, stearyl, myristyl or tridecyl esters, mercaptobenzimidazole, the zinc salt of 2-mercaptobenzimidazole, zinc dibutyl-dithiocarbamate, dioctadecyl disulfide, pentaerythritol tetrakis-(beta-dodecylmercapto)-propionate, and lead phosphate.

Non-limiting examples of antioxidants that can be used in the present invention include 2,6-di-t-butyl phenol, 2,4-di-t-butyl phenol, 2,6-di-t-butyl-4-methyl phenol, 2,5-di-t-butylhydroquinone, n-octadecyl-3-(3,5-di-t-butyl-4-hydroxyphenyl)propionate, pentaerythrityl-tetrakis[3-(3,5-di-t-butyl-4-hydroxyphenyl) propionate], 2,2'-methylenebis(4-methyl-6-t-butyl phenol), 4,4'-butylidenebis(3-methyl-6-t-butyl phenol), 4,4'-thiobis(3-methyl-6- -t-butyl phenol), N,N'-diphenyl-p-phenylenediamine, 6-ethoxy-2,2,4-trimethyl-1,2-dihydroquinoline and the antioxidants available under the trade name IRGANOX® from Ciba Specialty Chemicals, Basel, Switzerland.

Embodiments of the invention provide a coating composition, a sealant composition or an adhesive composition that includes the above-described curable, alkoxysilane-functional polyether urethane composition and one or more materials selected from one or more pigments, one or more plasticizers, and/or one or more fillers.

Suitable pigments, in addition to the pigments in c), that can be used in this embodiment include, but are not limited to perylenes, quinacridones, phthalocyanines, isoindolines, dioxazines (that is, triphenedioxazines), 1,4-diketopyrrolopyrroles, anthrapyrimidines, anthanthrones, flavanthrones, indanthrones, perinones, pyranthrones, thioindigos, 4,4'-diamino-11'-dianthraquinonyl, and azo compounds, as well as substituted derivatives thereof and mixtures thereof.

Suitable plasticizers that can be used in this embodiment include, but are not limited to those described above. Similarly, suitable fillers that can be used in this embodiment include, but are not limited to those described above.

In a particular embodiment of the invention, the adhesive, sealant or coating composition is moisture-curable.

The present invention also provides a method of bonding a first substrate to a second substrate including
- combining a), b), and c) from the composition described above to form a mixture,
- applying a coating of the mixture to at least one surface of the first substrate or the second substrate, and
- contacting a surface of the first substrate with a surface of the second substrate, where at least one of the contacting surfaces has the coating applied thereto.

In an embodiment of the method, one or both of the first substrate and the second substrate includes a substrate selected from the group consisting of wood, metals, plastics, paper, canvas, ceramics, stone, glass, and concrete.

In particular embodiments of the invention, the metal includes iron or aluminum and the plastic is selected from poly(ethylene), poly(propylene), poly(ethylene terephthalate), and mixtures thereof.

In embodiments of the above-described method, the first substrate and the second substrate are contacted at a temperature of from 0° C. to 150° C., in some cases from 10° C. to 125° C. and in some instances at a pressure of from atmospheric pressure to 500 psi, in some cases from atmospheric pressure to 300 psi.

Other embodiments of the invention are directed to an assembly made according to the above described method, the assembly including at least the first substrate and the second substrate bonded together.

The present invention is also directed to a method of coating a substrate including applying the above-described coating composition to at least a portion of a surface of the substrate. The invention also provides the coated substrate prepared according to the above-described method. As such, the substrate can be, but is not limited to one or more materials selected from wood, metals, plastic, paper, ceramics, minerals, stone, glass, and concrete. In particular embodiments, the substrates can include wood, metals such as ferrous substrates and aluminum substrates, and plastics.

The coating composition can be applied by conventional means including brushing, dipping, flow coating, spraying, and the like. Upon application to a substrate, the composition is allowed to coalesce to form a substantially continuous film on the substrate. The film is formed on the surface of the substrate by driving liquids out of the film by heating or by an air drying period.

A particular advantage of the above-described adhesive, sealant or coating compositions are their excellent physical properties. Accordingly, in some embodiments of the invention, after the adhesive, sealant or coating compositions are cured, the cured composition exhibits an elongation to break of greater than 200%. In other embodiments of the invention, after the composition is cured, the cured composition exhibits a tensile strength of greater than 500 psi. In additional embodiments of the invention, after the composition is cured, the cured composition exhibits a 100% Modulus of greater than 200 psi.

The present invention is more particularly described in the following examples, which are intended to be illustrative only, since numerous modifications and variations therein will be apparent to those skilled in the art. Unless otherwise specified, all parts and percentages are by weight.

EXAMPLES

Example 1

The example demonstrates the preparation of a silane functional aspartate. The aspartate resin was prepared according to U.S. Pat. No. 4,364,955, the relevant portions of which are herein incorporated by reference. To a 5-liter flask, fitted with agitator, thermocouple, nitrogen inlet, addition funnel and condenser was added 1483 g (8.27 equivalents (eq.)) of 3-aminopropyltrimethoxysilane followed by 1423.2 (8.27 eq.) diethyl maleate over a two hour period at 25° C., and held at that temperature for five hours. The unsaturation number, determined by iodine titration, was 0.6, indicating that the reaction was approximately 99% complete. The viscosity was 11 cps measured using a Brookfield® Digital Viscometer, Model DV-II+, Brookfield Engineering, Inc., Middleboro, Mass., spindle 52, 100 rpm at 25° C.

Example 2

This example demonstrates the synthesis of Monool 2 used in later examples. Nonylphenol (183 g (0.89 eq.) was charged to a stainless steel reactor. Zinc hexacyanocobaltate-t-butyl alcohol complex 0.143 g, prepared as described in U.S. Pat. No. 5,482,908, the relevant portions of which are herein incorporated by reference, was added and the mixture was heated with stirring under vacuum at 130° C. for one hour to remove any traces of water. Propylene oxide, 5,517 g (125.4 eq.) was introduced into the reactor over a 6-hour period. After the epoxides addition was completed, the mixture was vacuum stripped and then drained from the reactor.

Example 3

This example demonstrates the preparation of a silane terminated polyurethane ("STP-1"). Into a 5-liter round bottom flask fitted with an agitator, nitrogen inlet, condenser, heater and addition funnel was charged 191 g (1.72 eq.) of isophorone diisocyanate, 3,473 g (0.86) of a polyether polyol, ACCLAIM® 8200 (Bayer Polymers LLC, Pittsburgh, Pa., hereinafter "polyol 1"), and 0.8 g of dibutyltin dilaurate. The reaction was heated to 60° C. for 3 hours, after which time the NCO content was determined to be 0.95% (theoretical=0.99%) by IR spectroscopy. The aspartate resin of Example 1, 315.5 g (0.86 eq.) was then added to the mixture. The flask was maintained at 60° C. for 1 hour, after which time no NCO groups could be detected by IR spectroscopy. Vinyl trimethylsiloxane, 19.9 g was added as a moisture scavenger. The resulting product, which contained two silane groups per molecule, had a viscosity of 32,900 mPa.s. at 25° C.

Example 4

This example demonstrates the preparation of a silane terminated polyurethane ("STP-2"). Into a 5-liter round bottom flask fitted with an agitator, nitrogen inlet, condenser, heater and addition funnel was charged 112 g (1 eq.) of isophorone diisocyanate, 3,683 g (0.505) of monool 2 and 0.8 g of dibutyltin dilaurate. The reaction was heated to 60° C. for 3 hours after which time the NCO content was determined to be 0.54% (theoretical=0.56%) by IR spectroscopy. The aspartate resin of Example 1, 184.8 g (0.505 eq.) was then added to the mixture. The flask was maintained at 60° C. for 1 hour until no NCO groups could be detected by IR spectroscopy. Vinyl trimethylsiloxane, 19.9 g was added as a moisture scavenger. The resulting product, which contained two silane groups per molecule, had a viscosity of 10,500 mPa.s. at 25° C.

Examples 5–10

In these examples, pigments of different surface area are evaluated in a standard formula. The following carbon black pigments were used in the examples.

| Name | Form | $N_2$ Surface Area ($m^2$/gram) | Oil Absorption (cc/100 g) | Particle Size (nm) |
|---|---|---|---|---|
| REGAL ® 350R[1] | F | 58 | 46 | 48 |
| REGAL ® 99R[1] | F | 46 | 65 | 38 |
| ELFTEX ® 8[1] | F | 85 | 99 | 27 |
| REGAL ® 700[1] | F | 80 | 85 | 27 |
| BLACK PEARLS ® 460 | P | 84 | 102 | 29 |
| MONARCH ® 120[1] | F | 25 | 64 | 75 |
| COMPARATIVE: | | | | |
| MONARCH ® 700[1] | F | 200 | 122 | 18 |

[1]Cabot Corp., Boston, MA
F - fluffy material
P - peletized material

The compositions were prepared as follows using the ingredients in the following table. The carbon black was dried overnight at 160° C. The STP and polyol were mixed together and then the additives and half of the diisodecyl phthalate (DIDP) were added and mixed into the mixture using a high-speed centrifugal mixer (Hauschild Engineering, Hamm, Germany) for one minute at 2,200 rpm. The mixture was allowed to de-gas for 15 minutes in a vacuum oven at 50° C. One half of the carbon black was then added and mixed on the speed mixer for one minute at 2,200 rpm. One half of the remaining carbon black was then added and mixed on the speed mixer for one minute at 2,200 rpm. The remainder of the carbon black was then added and mixed on the speed mixer for one minute at 2,200 rpm. The remainder of the DIDP and other components were then added and mixed on the speed mixer for one minute at 2,200 rpm. The mixture was allowed to de-gas for 15 minutes in a vacuum oven at 50° C. The composition was then ready for film casting.

The sealant formulations were cast onto 0.25 inch thick polyethylene sheets and cured at standard conditions of 20° C., 50% relative humidity for at least two weeks before testing. Tensile strength, percent elongation and 100% modulus were determined according to ASTM D-412. Die "C" tear strengths were determined according to ASTM D-624. The results are set forth in the following table. The results are set forth in the following tables.

Examples 5–10 used the following ingredients in the formulation (weight ratio of STP-1:STP-2 was 70:30):

| STP-1 | 39.50 g |
|---|---|
| STP-2 | 23.50 g |
| Carbon Black | 79.00 |
| DIDP | 62.40 g |
| Aminosilane[2] | 0.79 g |
| BHT[3] | 0.20 g |
| Aminosilane[4] | 1.58 g |
| Hindered Amine[5] | 0.12 g |

| | Example | | |
|---|---|---|---|
| | 5 | 6 | 7 |
| Carbon Black | REGAL® 300R | ELFLEX® 8 | BLACK PEARL® |
| Tensile Strength | 675 psi | 708 psi | 623 psi |
| 100% Modulus | 211 psi | 231 psi | 294 psi |
| Elongation | 332% | 433% | 233% |
| Tear | 180 pli | 171 pli | 141 pli |

| | Example | | |
|---|---|---|---|
| | 8 | 9 | 10 |
| Carbon Black | REGAL® 350R | REGAL® 99R | MONARCH® 700 |
| Tensile Strength | 403 psi | 543 psi | Formulation too dry to make film |
| 100% Modulus | 124 psi | 141 psi | — |
| Elongation | 276% | 340% | — |
| Tear | 39 pli | 54 pli | — |

[2]SILQUEST ® A-171, OSI Corporation, Middlebury, CT
[3]4-methyl-2,6-di-tert-butylphenol (BHT)
[4]SILQUEST ® A-1189, OSI Corporation, Middlebury, CT
[5]TINUVIN ® 765, Crompton Corporation, Middlebury, CT The ELFLEX® 8 with a surface area of 85 m²/gm gave the best film strength and tear resistance. REGAL® 350R, which had the lowest oil absorption (structure) gave the lowest strength and tear properties. MONARCH® 700 had too small a particle size for the formulation and it was not possible to cast films.

Examples 11–16

These examples evaluated the impact of lowering the total functionality of the STP system. Examples 11–14 were prepared and evaluated as described above with an STP-1:STP-2 weight ratio of 50:50 according to the following ingredient table with the following results.

| STP-1 | 39.50 g |
|---|---|
| STP-2 | 39.50 g |
| Carbon Black | 79.00 |
| DIDP | 62.40 g |
| Aminosilane[2] | 0.79 g |
| BHT[3] | 0.20 g |
| Aminosilane[4] | 1.58 g |
| Hindered Amine[5] | 0.12 g |

| | Example | | |
|---|---|---|---|
| | 11 | 12 | 13 |
| Carbon Black | REGAL® 300R | ELFLEX® 8 | MONARCH® 120 |
| Tensile Strength | 600 psi | Formulation too dry to make film | 482 psi |
| 100% Modulus | 141 psi | — | 106 psi |
| Elongation | 415% | — | 358% |
| Tear | 52 pli | — | 35 pli |

| | Example | | |
|---|---|---|---|
| | 14 | 15 | 16 |
| Carbon Black | REGAL® 350R | REGAL® 99R | MONARCH® 700 |
| Tensile Strength | 332 psi | 502 psi | Formulation too dry to make film |
| 100% Modulus | 245 psi | 84 psi | — |
| Elongation | 396% | 506% | — |
| Tear | 38 pli | 44 pli | — |

[2]SILQUEST ® A-171, OSI Corporation, Middlebury, CT
[3]4-methyl-2,6-di-tert-butylphenol (BHT)
[4]SILQUEST ® A-1189, OSI Corporation, Middlebury, CT
[5]TINUVIN ® 765, Ciba Specialty Chemicals, Basel, Switzerland All of the pigments, which were dispersible in the STP, gave lower tensile strength and tear values, but higher elongation values. In this formulation, the particle size of ELFLEX® 8 and MONARCH® 700 was too small and caused the adhesive to be too dry to form a film.

Examples 17–20

These examples show the effect of different ratios of pigments and plasticizer. The total functionality of the STP in these examples is slightly lower than the blend used in Examples 5–10. Examples 17–20 were prepared and evaluated as described above varying the amounts of carbon black and DIDP as shown in the following table.

| | Example | | | |
|---|---|---|---|---|
| | 17 | 18 | 19 | 20 |
| STP-1 | 47.4 g | 47.4 g | 47.4 g | 47.4 g |
| STP-2 | 31.6 g | 31.6 g | 31.6 g | 31.6 g |
| MONARCH ® 120 | 79.0 g | 79.0 g | 94.8 g | 94.8 g |

-continued

| | Example | | | |
|---|---|---|---|---|
| | 17 | 18 | 19 | 20 |
| DIDP | 63.2 g | 47.4 g | 63.2 g | 47.4 g |
| SILQUEST ® A-171 | 0.79 g | 0.79 g | 0.79 g | 0.79 g |
| TINUVIN ® 765 | 0.12 g | 0.12 g | 0.12 g | 0.12 g |
| SILQUEST ® A-1189 | 1.58 g | 1.58 g | 1.58 g | 1.58 g |
| Xylene | 22.4 g | 22.4 g | 22.4 g | 22.4 g |
| Tensile Strength | 487 psi | 610 psi | 486 psi | Formulation too dry to make film |
| 100% Modulus | 127 psi | 185 psi | 176 psi | — |
| Elongation | 372% | 432% | 316% | — |
| Tear | 103 pli | 103 pli | 107 pli | — |

Example 18, which had the lowest amount of plasticizer along with the typical pigment level, gave the highest tensile strength and 100% Modulus value. Example 20, which had a high pigment level in combination with a low plasticizer amount, was too dry to form a film.

Examples 21–24

Examples 21–24 were prepared and evaluated as described above, except as noted below, varying the ratios of carbon black pigments as shown in the following table. The examples show the effect of using a blend of small and large particle size pigments along with a dispersing aid in the formula. Examples 21–23 were all mixed with the same procedure. Example 24 used the same formula as Example 21, but the pigment was pre-dispersed with the plasticizer, xylene, wetting agent and STP-2 before the rest of the ingredients were added.

| | Example | | | |
|---|---|---|---|---|
| | 21 | 22 | 23 | 24 |
| STP-1 | 31.05 g | 31.05 g | 31.05 g | 31.05 g |
| STP-2 | 13.05 g | 13.05 g | 13.05 g | 13.05 g |
| ELFTEX ® 8 | 22.04 g | 17.63 g | 13.22 g | 22.04 g |
| MONARCH ® 120 | 22.04 g | 26.45 g | 30.86 g | 22.04 g |
| DIDP | 35.27 g | 35.27 g | 35.27 g | 35.27 g |
| Dispersing Aid[6] | 4.41 g | 4.41 g | 4.41 g | 4.41 g |
| SILQUEST ® A-171 | 0.44 g | 0.44 g | 0.44 g | 0.44 g |
| BHT | 0.11 g | 0.11 g | 0.11 g | 0.11 g |
| TINUVIN ® 765 | 0.07 g | 0.07 g | 0.07 g | 0.07 g |
| SILQUEST ® A-1189 | 0.88 g | 0.88 g | 0.88 g | 0.88 g |
| Xylene | 25 g | 25 g | 25 g | 25 g |
| Tensile Strength | 451 psi | 518 psi | 347 psi | 509 psi |
| 100% Modulus | 86 psi | 76 psi | 60 psi | 114 psi |
| Elongation | 640% | 699% | 635% | 618% |
| Tear | 92 pli | 74 pli | 69 pli | 92 pli |

[6]BYK ® 9077, BYK-Chemie Gmbh, Wesel, Germany

The modified preparation in Example 24 compared with Example 21 resulted in better wetting of the pigment and better properties. In general, as more of the large particle size pigment was used the 100% Modulus and Tear Strength decreased.

Although the invention had been described in detail in the foregoing for the purpose of illustration, it was to be understood that such detail was solely for that purpose and that variations can be made therein by those skilled in the art without departing from the spirit and scope of the invention except as it may be limited by the claims.

What is claimed is:

1. An adhesive, sealant or coating composition comprising:
   a) 20 to 80% by weight, based on the weight of a), b), and c) of a polyether urethane containing two or more reactive silane groups and one or more polyether segments
   b) 20 to 80% by weight, based on the weight of a), b), and c) of a polyether urethane containing one reactive silane group and one or more polyether segments, and
   c) 1 to 60% by weight, based on the weight of a), b), and c) of a pigment having a BET surface area of from 15 to 75 m²/g and an oil absorption of from 40 to 110 cc/100 g;
   wherein the sum of a), b), and c) does not exceed 100% by weight.

2. The composition of claim 1, wherein the pigment has an average particle size of from 30 to 90 nm.

3. The composition of claim 1, wherein the pigment is selected from the group consisting of carbon black, titanium dioxide, calcium carbonate, iron oxide, aluminum trihydroxide, mica, calcium metasilicate, and mixtures thereof.

4. The composition of claim 1, wherein the pigment comprises carbon black.

5. The composition of claim 1, wherein the polyether urethane of a) includes polyether segments having a combined number average molecular weight of from 1,000 to 20,000 and the reactive silane groups are incorporated as the reaction product of an isocyanate group with a compound corresponding to the formula

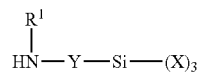

wherein
X represents identical or different organic groups which are inert to isocyanate groups below 100° C., provided that at least two of these groups are alkoxy or acyloxy groups,
Y represents a linear or branched alkylene groups containing 1 to 8 carbon atoms and
$R_1$ represents an organic group which is inert to isocyanate groups at a temperature of 100° C. or less or a group corresponding to the formula

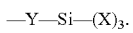

6. The composition of claim 5, wherein
X represents identical or different alkoxy groups having 1 to 4 carbon atoms and
Y represents a linear radical containing 2 to 4 carbon atoms or a branched radical containing 5 to 6 carbon atoms and
$R_1$ represents an alkyl, cycloalkyl or aromatic group having 1 to 12 carbon atoms.

7. The composition of claim 1, wherein the isocyanate group is from a polyisocyanate containing from 2 to 6 isocyanate groups.

8. The composition of claim 7, wherein the polyisocyanate has a structure according to the formula:

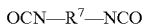

wherein $R^7$ is selected from $C_2$ to $C_{24}$ linear, branched, and cyclic alkylene, arylene, and aralkylene, which may optionally contain one or more isocyanate groups.

9. The composition of claim 7, wherein the polyisocyanate is selected from the group consisting of 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3- and -1,4-diisocyanate, 1-isocyanato-2-isocyanatomethyl cyclopentane, 1-isocyanato-3-isocyanatomethyl-3,5,5-trimethyl-cyclohexane, bis-(4-isocyanatocyclohexyl)-methane, 2,4'-dicyclohexyl-methane diisocyanate, 1,3- and 1,4-bis-(isocyanatomethyl)-cyclohexane, bis-(4-isocyanato-3-methyl-cyclohexyl)-methane, α,α,α',α'-tetramethyl-1,3-diisocyanate, α,α,α',α'-1,4-xylylene diisocyanate, 1-isocyanato-1-methyl-4(3)-isocyanatomethyl cyclohexane, 2,4-hexahydrotoluylene diisocyanate, 2,6-hexahydrotoluylene diisocyanate, 1,3-phenylene diisocyanate, 1,4-phenylene diisocyanate, 2,4-toluylene diisocyanate, 2,6-toluylene diisocyanate, 2,4-diphenyl-methane diisocyanate, 4,4'-diphenyl-methane diisocyanate, 1,5-diisocyanato naphthalene and mixtures thereof.

10. The composition of claim 1, wherein the reactive silane groups of component b) are incorporated as the reaction product of an isocyanate group and a compound corresponding to the formula

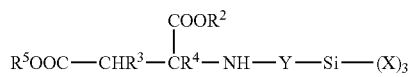

wherein

R$^2$ and R$^5$ are identical or different and represent organic groups which are inert to isocyanate groups at a temperature of 100° C. or less and R$^3$ and R$^4$ are identical or different and represent hydrogen or organic groups which are inert towards isocyanate groups at a temperature of 100° C. or less.

11. The composition of claim 10 wherein the reactive silane groups of component b) are incorporated as the reaction product of an isocyanate group and a compound corresponding to the formula

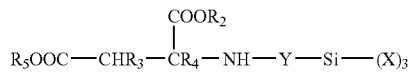

wherein

R$^2$ and R$^5$ are identical or different and represent alkyl groups having 1 to 4 carbon atoms and R$^3$ and R$^4$ represent hydrogen.

12. The polyether urethane of claim 1 wherein the reactive silane groups of component b) are incorporated as the reaction product of an isocyanate group and a compound corresponding to the formula

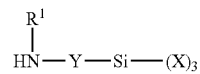

wherein

X represents identical or different organic groups which are inert to isocyanate groups below 100° C., provided that at least two of these groups are alkoxy or acyloxy groups, Y represents a linear or branched alkylene group containing 1 to 8 carbon atoms and R$_1$ represents an organic group which is inert to isocyanate groups at a temperature of 100° C. or less or a group corresponding to the formula:

(II).

13. The composition of claim 1, further comprising one or more materials selected from the group consisting of leveling agents, wetting agents, flow control agents, antiskinning agents, antifoaming agents, fillers, adhesion promoters, viscosity regulators, plasticizers, dyes, UV absorbers, thermal stabilizers, antioxidants, and mixtures thereof.

14. The composition of claim 1, wherein the adhesive, sealant or coating composition is moisture-curable.

15. The composition of claim 1, wherein after the composition is cured, the cured composition exhibits an elongation of greater than 200%.

16. The composition of claim 1, wherein after the composition is cured, the cured composition exhibits a tensile strength greater than 500 psi.

17. The composition of claim 1, wherein after the composition is cured, the cured composition exhibits a 100% Modulus of greater than 200 psi.

18. The composition of claim 1, wherein the pigment has an average particle size of from 35 to 90 nm.

19. The composition of claim 2, wherein the pigment comprises carbon black.

20. The composition of claim 18, wherein the pigment comprises carbon black.

* * * * *